United States Patent Office 2,932,644
Patented Apr. 12, 1960

2,932,644
SULFUR CONTAINING REACTION PRODUCTS
Joseph A. Lambrech, Charleston, and William H. Hensley, St. Albans, W. Va., Robert E. Kent, Waterford, Conn., and John E. Lynch, Maywood, N.J., assignors to Chas. Pfizer & Co., Inc., New York, N.Y., a corporation of Delaware No Drawing. Application May 9, 1957
Serial No. 658,024
3 Claims. (Cl. 260—268)

This invention relates to a new group of sulfur containing reaction products of piperazine. These materials are useful as vulcanizing agents, and in the treatment of helminthic infections of man and animals. They are obtained by the reaction of piperazine with sulfur dichloride.

The unique properties of elemental sulfur has made it a universally accepted vulcanizing agent for all types of rubber stock for many years. Improved vulcanizing agents are in demand, however, particularly where reinforcing agents such as furnace blacks are employed. Scorching or prevulcanization at the temperatures required is a particularly aggravated problem with these stocks. An object of the present invention is to provide vulcanization accelerators adapted to use with such stocks which alleviate these conditions.

A further object of this invention is to provide new and improved anthelmintic agents. In the field of therapeutics, helminthic infections are among the most widespread disease conditions. The public health significance of animal and human infestations by these parasites and the resulting economic losses has resulted in extensive research for new and more useful anthelmintic agents. Many diverse substances have been used for this purpose in the past. Recently piperazine either as the base or the citrate salt has come into favor as an anthelmintic agent. Its activity, however, is limited primarily to pin worm infestations (oxyuriasis) and large round worm infestations (ascariasis). Another piperazine derivative which has become available recently for this use is piperazine carbodithioic betaine, but it too suffers from the disadvantage of having rather limited anthelmintic activity and further has been used principally for the treatment of animals due to its side reactions particularly emesis. Among the untoward side effects of piperazine is that it occasionally produces diarrhea, urticaria, vomiting, blurred vision, and general muscle weakness. Further there has been some indication that piperazine is rapidly absorbed from the gastrointestinal tract. This, of course, is disadvantageous where helminthic infestations which are seated in the intestinal tract are concerned. It is important in such cases to maintain therapeutic levels of the drug in the intestines for prolonged periods. Absorption with the resulting systemic effects is not desired.

Many derivatives of piperazine have been tested in the continuing search for a substance with improved anthelmintic activity. These have proven disappointingly and uniformly inferior to the parent substance. The activity in this series is confined primarily to piperazine, its salts, and to one or two closely related substances. Thus Brown, in the American Journal of Tropical Medicine and Hygiene, vol 3, page 504, (1954), reports results of testing 32 piperazine derivatives against pinworm. Piperazine proved to be the most active substance and was the only useful member of the series. The piperazine derivatives tested contained up to four substituents varying among simple alkyl groups, substituted alkyl groups bearing hydroxyl, keto, ester, various nitrogen containing functions, or more complicated substituents such as aromatic and heterocyclic rings.

It has now been found that the substances obtained by reacting piperazine with sulfur dichloride under certain conditions have a surprisingly high degre of anthelmintic activity against a number of disease producing parasites including certain species unaffected by prior agents. These unique substances exert their therapeutic effect with remarkably few side effects. In addition, improved low scorch rubber formulations can be obtained with these substances as vulcanization accelerators.

The valuable compounds of the present invention are thought to be made up of two or more piperazine molecules linked together through sulfur. They contain from about 26 to about 45% by weight of sulfur. Those products containing up to about ten piperazine nuclei per molecule are useful for the above purposes. All of these substances are considered within the scope of the present invention. The simplest member is where two piperazine molecules are joined through sulfur. The nature of the sulfur linkage is not known.

The valuable piperazine thioamines of the present invention are prepared by the reaction of piperazine with sulfur dichloride. The reaction is preferably carried out in an inert organic solvent such as the liquid aromatic hydrocarbons including benzene, toluene, xylene; liquid aliphatic hydrocarbons including hexane, octane, kerosene, naphtha, etc.; halogenated lower aliphatic hydrocarbons including chloroform, methylene chloride, carbon tetrachloride, tetrachlorobutane, etc. The reaction is carried out at temperatures from about $-15°$ C. up to about $100°$ C. but the range from about $0°$ to $50°$ C. is preferred. Below $0°$ C. the reaction is rather slow while above $50°$ C. side reactions and decompositions sometimes occur. This temperature range is also more economical for large scale production since neither elaborate heating or refrigerating apparatus is required.

From about 2 to about 4 moles of piperazine per mole of sulfur dichloride is employed to obtain the valuable products of the present invention. Higher ratios can be employed but there is no purpose achieved by using larger excesses of piperazine. Use of less than two moles of piperazine per mole of sulfur dichloride is detrimental and is to be avoided.

Recovery of the product can be accomplished by any of a number of methods. The precipitated solids, for instance, can be simply collected by any convenient means such as filtration or centrifugation. Such a product is generally made up of a mixture containing piperazine hydrochlorides and the desired product since both substances are insoluble in most of the common solvent media employed for the reaction. A similar product can be recovered by simple evaporation of the solvent. The active material can be separated from the by-product hydrochloride salts of piperazine by the addition of dilute aqueous alkali to the reaction mixture at the conclusion of the reaction period or to the solid mixture of reaction products obtained as above. By aqueous alkali is meant a solution or suspension of an inorganic base, a metal salt of a hydrocarbon carboxylic acid or an amine whose basicity is greater than that of piperazine, i.e., whose ionization constant is about $10^{-4}$ or greater. Useful alkalies include such reagents as sodium carbonate, calcium carbonate, potassium carbonate, lime, potassium and sodium hydroxides, sodium benzoate, sodium acetate, potassium acetate, calcium propionate, methylamine, butylamine, diethylamine, dipropylamine, methyldiethylamine, piperidine, etc. The neutralization products, that is the piperazine and the metal halide, are generally water soluble and are separated in the aqueous layer. The sulfur containing reaction product is collected by filtration of the organic layer. Separation of the two solvent phases when a water insoluble solvent is used is not necessary prior to filtration.

According to one preferred embodiment of the invention solutions of the piperazine and the sulfur dichloride, for instance benzene solutions, are prepared in a ratio of 4 moles of piperazine per mole of sulfur dichloride cooled to about 5° C., mixed with one another with cooling, and then the resulting reaction mixture allowed to warm to about 25° C. A mixture of piperazine hydrochlorides and the product precipitates. The piperazine hydrochloride is neutralized and separated from the product by adding the dilute (about 3-20%) aqueous sodium hydroxide. The insoluble product is collected and washed with water which removes any residual piperazine, sodium chloride, or piperazine hydrochloride. Material prepared in this fashion has a melting point in the range of 195° C. to 215° C. and contains from about 26% to 30% of chemically bound sulfur corresponding substantially in composition to a product having one atom of sulfur for each molecule of piperazine combined. It varies in color from white to pale yellow. Spectral measurements indicate that no uncombined piperazine remains in the product.

The term chemically bound sulfur is used to distinguish from physical mixtures of sulfur with piperazine or reaction products thereof. The sulfur can be removed from such physical mixtures by solvent extraction using the common sulfur dissolving solvents such as carbon disulfide, alcohol, etc. The sulfur combined in the valuable piperazine derivatives of the present invention cannot be so removed.

According to another preferred embodiment of the present invention, piperazine is allowed to react with sulfur dichloride in the above fashion but in the ratio of two moles of piperazine per mole of sulfur dichloride. The product recovered from this process as above has a melting point of 195° C. and contains from about 40 to 45 percent of chemically bound sulfur. The composition of this material thus corresponds roughly to a product containing 2 atoms of sulfur for each molecule of piperazine combined. The precise fashion in which the sulfur is combined is not known but it is known that the substance differs markedly from a linear N-thiopiperazine of similar composition from piperazine and sulfur nonchloride. These differences include behavior on treatment with aqueous acid; in infrared absorption spectrum; in melting point; and in biological activity. The latter point is discussed in detail hereinafter. The new 40-45% sulfur substance of the present invention is decomposed by aqueous hydrochloric acid with the liberation of sulfur and hydrogen sulfide. An N-thiopiperazine of similar composition but obtained from sulfur monochloride on treatment with aqueous hydrochloric acid is decomposed also with the liberation of sulfur, but no hydrogen sulfide is evolved. This reflects a fundamental difference in chemical structure between the two substances which as yet has not been determined. Characteristic differences in the infrared spectra of these two substances occur at 7.55, 8.10, 8.45, 9.38, 9.77, 10.80, 11.25, 11.60µ. Further, great differences in intensity occur at a number of other wave lengths where maxima for each substance are located.

One reason suggested for the variation in melting point sometimes observed for the substances of the present invention is that products of various molecular weights are obtained. Accurate determinations of the average molecular weights of these products have not been obtained since their insolubility in the solvents usually used for ebullioscopic and cryoscopic methods for determining molecular weight has prevented use of these techniques. Further, the fact that they are extremely nonvolatile has rendered mass spectrographic analysis of them unsatisfactory. The piperazine derivatives of the present invention are stable to dilute aqueous alkali but are degraded by dilute (e.g. 0.1 N) hydrochloric acid at room temperature as indicated above. They are only slightly soluble in ethanol, isopropanol, dimethylformamide, and dimethyl sulfoxide. This apparent partial solubility may be the result of the leaching out lower molecular weight components. They are virtually insoluble in water and in the non-polar organic solvents. Variations sometimes encountered in technical grade sulfur dichloride appear to have an effect on the composition of the product within the above limits.

In the preparation of the present piperazine thioamines, it is not essential that anhydrous piperazine be employed. For example, 90% piperazine in which the main impurity is water has been used satisfactorily. Piperazine hexahydrate which contains a higher proportion of water can be used, but provides a product having somewhat lower anthelmintic activity.

The anthelmintic activity of the valuable compounds of the present invention was demonstrated against a natural infection of mice with pin worm (*Syphacia obvelata*). The test mice were readily infected by associating them with naturally infected mice known as source mice. The experimental mice acquired their infection over a number of days and therefore harbored worms in several stages of development when treated with the test compounds. A convenient technique is described by Kam-Fai Chan in the American Journal of Hygiene, volume 56, pages 22–30 (1952). The test mice were housed for a period of eight days with the source mice during which time they became infested with the pin worm which is similar in its host parasite relationship to nematodes of human and veterinary importance. In general, mice of similar weight were infected by the parasites in similar stages of development. On the 8th and 9th days after exposure to the source mice, the test compounds were administered to the mice to be treated by the oral route. A single dose daily was employed on each of the days. The treated mice were then sacrificed on the 11th day, about 48 hours after their last doses of the drug, and all stages S. obvelata in the cecum were counted. Differences in worm burden between the treated and untreated groups provided a numerical value called percent reduction in worm burden which served to express the relative antipinworm activities of the compounds. Results of this test are tabulated below. For purposes of comparison, the values obtained for piperazine, piperazine citrate, and piperazine carbodithioic acid betaine, commercial anthelmintic agents current in wide use are given. Also for comparison, results obtained with the N-thiopiperazine obtained from piperazine and sulfur monochloride are given. This table illustrates the high activity of the products of the present invention and shows the striking advantage of these materials over the commercial anthelmintics and comparable sulfur monochloride derived products particularly at the low dosage levels. Activity of these low dosage levels provides the basis for prophylactic use of these substances.

TABLE I

Comparative anthelmintic activity vs. Syphacia obvelata in mice

| Agent | Percent Reduction in Worm Burden at Various Dosages (dosage levels in mg./kg.) | | | | | | | |
|---|---|---|---|---|---|---|---|---|
| | 3.9 | 7.8 | 15.6 | 31.2 | 62.4 | 125 | 250 | 500 |
| 1. Piperazine | 0 | 0 | 0 | 40 | 60 | 95 | 99 | ---- |
| 2. Piperazine citrate | 0 | 0 | 0 | 0 | 51 | 73 | 96 | ---- |
| 3. Piperazine carbodithioic betaine | 0 | 0 | 0 | 0 | 79 | 85 | 91 | 100 |
| 4. Piperazine-sulfur dichloride product—28% S (Example I) | 28 | 45 | 57 | 51 | 86 | 95 | 99 | 100 |
| 5. Piperazine-sulfur dichloride product—41% S (Example II) | 38 | 44 | 53 | 51 | 86 | 90 | 96 | 98 |
| 6. N-Thiopiperazine from sulfur monochloride—43% S (Example III) | 0 | 0 | 0 | 5 | 41 | 83 | 90 | ---- |

The utility of the novel substances of the present invention in helminthic therapy was further demonstrated in swine infected with round worms (*Ascaris lumbricoides*), and whip worms (*Trichuris suis*) employing samples prepared by both preferred methods i.e. the 26–30% material and the 40–45% material. The swine were diagnosed as infected with the above organisms by fecal examination on three consecutive days prior to dosing with the test compounds. In each instance, ova were found in the feces. Treated swine were held 72 hours after dosing during which time periodic fecal examinations were made. At the end of the holding period, the animals were sacrificed and their intestines examined for the presence of ascarids and whip worms. Control experiments were carried out for comparison in which infested swine were medicated with sodium fluoride, piperazine dihydrochloride, and piperazine carbodithioic betaine individually. Autopsy examination revealed that sodium fluoride, piperazine dihydrochloride, and piperazine carbodithioic betaine were ineffective against whip worms at doses of 580 mg./kg., 200 mg./kg., and 250 mg./kg. respectively. On the other hand, the substances of the present invention proved to be active against whip worms in a single dose of 250 mg./kg. In further single dose experiments with swine infested with ascarids, these substances proved to be active in doses of 75 mg./kg. administered orally contained in gelatin capsules. The commercial anthelmintic agents above are also active against ascarids, but at higher levels. The increased activity of the present piperazine-sulfur dichloride products was particularly striking in multiple dose experiments. In these experiments, the drugs were administered in two or three consecutive daily doses. They proved to be active in swine at 25 mg./kg. against both whip worms and ascarids when administered on three consecutive days. Piperazine carbodithioic acid betaine was completely inactive against these helminths when administered according to this regimen, but was found to be active in multiple doses of 100 mg./kg. The activity of these new sulfur containing products at this low level is indeed a great advantage and suggests its use on a prophylactic basis. These materials were also found to be active against nodular worms in pigs in doses of 125 mg./kg.

No toxic manifestations of the substances of the present invention were observed in the above experiments. In fact, in acute toxicity tests with mice, the $LD_{50}$ by the intraperitoneal route was found to be greater than 2,000 mg./kg. This is indeed a remarkably low toxicity when it is considered that piperazine has an intraperitoneal toxicity ($LD_{50}$) of 360 mg./kg. and piperazine carbodithioic betaine 30 mg./kg. Of course, these substances are not customarily administered by this route for therapeutic purposes, but the fact that such a low toxicity even when administered by this route has been observed reflects their safety as therapeutic agents. Oral toxicities ($LD_{50}$) are also in excess of 2,000 mg./kg.

In addition to the greater activity at the lower dosage levels and broader anthelmintic spectrum, the piperazine-sulfur dichloride product containing about 43% sulfur was found to have certain further advantages over present commercially available anthelmintic agents. The incidence of emesis and diarrhea, very troublesome side effects with commercial piperazine-type anthelmintics, was found to be much lower and almost nonexistent with this substance. Further, there was some indication in the treatment of swine with this material that it is more palatable to the animal. Some indication was also obtained in the treatment of ascarids in swine that the expelled worms were dead as opposed to previous agents which result in the expulsion of viable organisms allowing reinfection.

A controlled experiment was carried out to confirm the lower incidence of emesis and diarrhea. Commercially available piperazine citrate, piperazine carbodithioic betaine, and the high sulfur product of the present invention were administered to different dogs at various dosage levels and the number of emetic and diarrheal responses observed. The results of this test are compared in Table II.

TABLE II

*Comparative emesis and diarrhea in dogs*

| | Dose (mg./kg.), Day | Emesis [1] | Diarrhea [1] |
|---|---|---|---|
| Piperazine citrate | 250 | 4/12 | 2/12 |
| | 250 | 0/3 | 0/3 |
| | 250 | 3/3 | 0/3 |
| | 500 | 2/2 | 0/2 |
| | 500 | 0/2 | 0/2 |
| Piperazine Carbodithioic Betaine | 250 | 4/9 | 0/9 |
| | 250 | 5/12 | 2/12 |
| | 500 | 2/2 | 0/2 |
| | 500 | 1/2 | 1/2 |
| Piperazine-sulfur dichloride product S 41% (Example II) | 250 | 0/12 | 0/12 |
| | 250 | 0/12 | 0/12 |
| | 500 | 0/12 | 0/12 |
| | 500 | 2/12 | 2/12 |
| | 1,000 | 0/4 | 2/4 |
| | | 0/4 | 1/4 |

[1] Number of responses/number of doses received.

It is apparent from Table II that the 43% S product prepared in accordance with the present invention is devoid of any significant emetic or diarrheal properties at doses of 250 mg./kg./day even after twelve consecutive doses. On the other hand, diarrhea and vomiting was frequently observed with the prior art substances. This contrasting result becomes even more apparent as the dosage is increased to 500 mg./kg./day. To further confirm the high degree at which the high sulfur product of the present invention is tolerated, doses of 1,000 mg./kg./day were administered to two dogs on four consecutive days. Some difficulty with diarrhea was then encountered, but no emesis was observed.

Thus, the novel products of this invention were found to have a very low toxicity, to be active against ascarids and nodular worms, and significantly to be effective against whip worms where previous anthelmintic agents have failed. There is indeed no satisfactory agent for the treatment of whip worm in swine presently available although sodium fluoride has been suggested. Notwithstanding its superior activity over this material, the present piperazine-sulfur dichloride products have the advantage over sodium fluoride of being non-toxic and safe to use and further a remarkable freedom from gastro-intestinal side effects has been observed.

Use of these novel piperazine derivatives for the treatment of helminthiasis in man and animals involves administration by the oral route since the major site of infection is ordinarily the intestinal tract. One of the attributes of these new drugs is indeed that they are highly effective orally. For the treatment of domestic animals with poly-N,N'-thiobis(piperazine), a single dose of 75 to 250 mg./kg. is generally sufficient to clear the animal of the infecting parasite. Doses as low as 10–25 mg./kg. can be used if repeated on three or more consecutive days.

In human beings, as with animals, the dosage varies with the size of the patient. Two courses of treatment with the piperazine-sulfur dichloride products each lasting approximately one week separated by a rest period of one week is preferred for the treatment of pinworm, for example. A single course of treatment may be used. For infants weighing less than 15 pounds; a daily dose of 75 mg. is recommended. For children, weighing under 30 pounds, twice this dosage is employed. With adults, and large children (over 60 lbs.), two to four 150–500 mg. doses per day during each course of treatment are preferred. Thus the useful dosage range for humans is from about 75 mg. to about 2 g. per day or from about 10 to 75 mg./kg. per day. For this purpose, these substances can be compounded into any of the usual oral dosage forms including capsules, tablets, and liquid preparations such as suspensions containing various coloring flavoring, and taste masking substances.

As vulcanization accelerators the valuable piperazine thioamines of the present invention are used in one to ten parts by weight per hundred parts by weight of natural or synthetic rubber along with the other usual vulcanization components including such things are carbon black, zinc oxide, stearic acid, various quinoline derivatives, and sulfenamides. Vulcanization temperatures of about 130 to 150° C. for about 60–90 minutes are employed. In most instances, concentrations of the valuable accelerators of the present invention in the range from about 3 to 6 percent yield satisfactory results.

The following examples are provided to further illustrate the manner in which our invention is to be practiced. They are, however, not to be considered as limiting the scope thereof in any way.

EXAMPLE I

*Piperazine-sulfur dichloride product—28% S*

Sulfur dichloride, 10.5 (0.1 mole) was dissolved in 50 ml. of benzene with cooling. A similar solution was then prepared containing 38 g. of anhydrous piperazine in 300 ml. of benzene. These two solutions were mixed with cooling at 5° C. and the temperature allowed to rise slowly to 25° C. During this time, a precipitate formed which was comprised of piperazine hydrochloride and the desired material. A solution of 8 g. of sodium hydroxide in 50 ml. of water was added to neutralize the piperazine hydrochloride. The product which remained was then collected, washed thoroughly with water, and air-dried. It was a pale yellow solid having a melting point of 214° C.

*Analysis.*—Calcd. for $C_4H_8N_2S$: C, 41.37; H, 6.8; N, 24.13; S, 27.6. Found: C, 39.84; H, 7.64; N, 23.36; S, 28.68.

Inrared absorption maxima for this substance occur at the following wave lengths: 3.45, 3.55, 6.93, 7.40, 7.80, 7.79, 8.10, 8.45, 8.92, 9.45, 9.77, 10.60, 12.27, 13.60, 14.30$\mu$.

EXAMPLE II

*Piperazine-sulfur dichloride product—43% S*

Piperazine (90.4%), 192 g. (2 moles), is dissolved in 1 l. of benzene contained in a 5 l. flask. It is convenient to warm the mixture to 50° C. in order to aid in dissolving the piperazine. The solution is cooled to 5° C. and a solution of 103 g. (1 mole) of sulfur dichloride in 300 ml. of benzene is added slowly with stirring and cooling at 5–10° C. When the addition is complete, the mixture is stirred and allowed to warm at room temperature over a period of four hours. The precipitated solid is collected on a filter and the resulting cake mixed with 1500 ml. of water and neutralized by the addition of 80 g. (2 moles) of sodium hydroxide dissolved in 300 ml. of water. The desired product was recovered by filtration, washed with water, and air-dried. This material weighed 75 g. and melted at 195° C.

*Analysis.*—Found: C, 35.4; H, 5.3; N, 15.9; S, 40.7.

Maxima in the infrared region of the spectrum were exhibited by this substance at the following wavelengths: 3.45, 3.55, 6.93, 7.40, 7.80, 7.97, 8.92, 9.45, 10.60, 11.25, 12.27, 13.50, 14.40$\mu$.

EXAMPLE III

*N-thiopiperazine from sulfur monochloride*

Sulfur monochloride, 27 g. (0.2 mole), was dissolved in 100 ml. of benzene and added with stirring to a solution of 72 g. (0.8 mole) of 90.4% piperazine in 500 ml. of benzene at 10–15° C. A precipitate formed at once. A solution of 18 g. of sodium hydroxide in 500 ml. of water was added, the precipitate collected, washed with water, and air-dried. The product obtained in this fashion was a white solid, M.P. 156° C.

*Analysis.*—Calcd. for: $C_4H_8N_2S_2$: N, 18.9. Found: N, 18.25.

This substance exhibits infrared absorption maxima at the following wavelengths: 3.45, 3.55, 6.93, 7.40, 7.55, 7.80, 7.97, 8.10, 8.45, 8.92, 9.38, 9.77, 10.60, 10.80, 11.60, 13.70, 14.30$\mu$.

EXAMPLE IV

A natural rubber stock consisting of the following materials is prepared and vulcanized at 135° for about 90 minutes.

| Material | Ratio by Weight |
| --- | --- |
| Natural rubber smoke sheets | 100 |
| High abrasion furnace black | 50 |
| Zinc oxide | 5.0 |
| Stearic acid | 2.0 |
| Mineral hydrocarbon softener | 3.0 |
| 6-Phenyl-1,2-dihydro 2,2,4-trimethylquinoline | 1.5 |
| N-Cyclohexyl-2-benzothiazole sulfenamide | 0.8 |
| Piperazine-sulfur dichloride product 28% S | |

Scorch tests are carried out at 135° C. in an NBS Model Mooney viscometer according to A.S.T.M. D1077–49T. Heat generation is measured by the Goodrich flexometer (A.S.T.M. D623–41T Method A) using 175 lbs. per square inch stress, 0.175-inch stroke, and 30 cycles per second frequency. Flex cracking is measured in a De Mattia flexometer according to A.S.T.M. D813–44T. Results of these tests demonstrate the desirable properties of this vulcanized stock to confirm the utility of the material as a vulcanizing agent.

EXAMPLE V

The procedure of Example IV is repeated substituting for the natural rubber smoke sheets an equal weight of GR–S(X–478) synthetic rubber (styrene, 1–3, butadiene copolymer).

What is claimed is:

1. The reaction product containing from about 26 to about 45% of chemically bound sulfur said reaction product being obtained by the process of contacting piperazine with sulfur dichloride in benzene at a temperature at from about −15° C. to 100° C. there being about from 2 to 4 molar proportions of piperazine for each molar proportion of sulfur dichloride employed in said process.

2. The reaction product containing from about 26 to 30% of chemically bound sulfur said reaction product being obtained by the process of contacting piperazine with sulfur dichloride in benzene at a temperature of from about −15° C. to 100° C. adding aqueous alkali to neutralize by-product hydrochloride salts of piperazine, and recovering the so produced reaction product, there being about 4 molar proportions of piperazine for each molar proportion of sulfur dichloride employed in said process.

3. The reaction product containing from about 40 to 45% of chemically bound sulfur said reaction product being obtained by the process of contacting piperazine with sulfur dichloride in benzene at a temperature of from about −15° C. to 100° C. adding aqueous alkali to neutralize by-product hydrochloride salts of piperazine, and recovering the so produced reaction product, there being about 2 molar proportions of piperazine for each molar proportion of sulfur dichloride employed in said process.

References Cited in the file of this patent

UNITED STATES PATENTS

| | | |
| --- | --- | --- |
| 2,209,976 | James | Aug. 6, 1940 |
| 2,659,724 | Zerbe | Nov. 17, 1953 |
| 2,766,236 | Harmon | Oct. 9, 1956 |
| 2,808,409 | D'Amico | Oct. 1, 1957 |